(12) United States Patent
Kosanke

(10) Patent No.: US 10,130,073 B2
(45) Date of Patent: Nov. 20, 2018

(54) PROTECTIVE SHOE FOR BIRDS

(71) Applicant: Tobi Kosanke, Hempstead, TX (US)

(72) Inventor: Tobi Kosanke, Hempstead, TX (US)

(73) Assignee: Crazy K Farm Pet and Poultry Products, LLC, Hempstead, TX (US)

( * ) Notice: Subject to any disclaimer, the term of this patent is extended or adjusted under 35 U.S.C. 154(b) by 40 days.

(21) Appl. No.: 15/351,095

(22) Filed: Nov. 14, 2016

(65) Prior Publication Data

US 2017/0055497 A1 Mar. 2, 2017

Related U.S. Application Data (62) Division of application No. 14/017,060, filed on Sep. 3, 2013, now Pat. No. 9,532,550.

(60) Provisional application No. 61/696,239, filed on Sep. 3, 2012.

(51) Int. Cl.
*A01K 13/00* (2006.01)
*A61D 9/00* (2006.01)

(52) U.S. Cl.
CPC .............. *A01K 13/007* (2013.01); *A61D 9/00* (2013.01)

(58) Field of Classification Search
CPC ..... A61D 1/005; A01K 13/007; A01K 13/006

USPC ............................ 36/111; 119/851, 853, 850
See application file for complete search history.

(56) References Cited

U.S. PATENT DOCUMENTS

| | | | |
|---|---|---|---|
| 2,197,537 A | 4/1940 | Cheeley | |
| 2,424,172 A | 7/1947 | Huddleston | |
| 5,406,722 A | 4/1995 | Jones | |
| 6,546,704 B1 * | 4/2003 | Fisher | A01K 13/007 119/856 |
| 7,677,206 B1 * | 3/2010 | Southworth | A01K 13/007 119/850 |
| 9,532,550 B2 * | 1/2017 | Kosanke | A01K 13/007 |

* cited by examiner

*Primary Examiner* — Ted Kavanaugh
(74) *Attorney, Agent, or Firm* — Maback & Hoffman, P.A.; Gregory L. Mayback (57) ABSTRACT

A protective shoe to accommodate a foot of waterfowl having toes with nail tips includes a shoe body, an ankle cuff, and a closure tab. The shoe body is in approximately a shape of a waterfowl foot and has an upper surface and a sole connected together to define left front, center front opening, and right front openings, and a foot entrance opening into which the waterfowl foot is inserted. The front openings are sized to permit at least the nail tip of a respective toe to extend therethrough. The ankle cuff is connected to the shoe body and has an ankle closure system formed to secure about an ankle of the waterfowl's foot. The closure tab is connected to the shoe body and has a closure system formed to cover at least a portion of the foot entrance opening to secure the waterfowl's foot inside the shoe body.

13 Claims, 5 Drawing Sheets

PROTECTIVE SHOE FOR BIRDS

CROSS-REFERENCE TO RELATED APPLICATIONS

This application is a divisional of U.S. patent application Ser. No. 14/017,060, filed Sep. 3, 2013, which application claims the priority, under 35 U.S.C. § 119, of U.S. Provisional Patent Application No. 61/696,239, filed Sep. 3, 2012, the prior applications are herewith incorporated by reference herein in their entireties.

STATEMENT REGARDING FEDERALLY SPONSORED RESEARCH OR DEVELOPMENT

Not Applicable

FIELD OF THE INVENTION

The present invention lies in the field of bird protection. The present disclosure relates to a protective shoe for birds.

BACKGROUND OF THE INVENTION

Poultry and other multi-toed birds are prone to foot injuries that lead to "bumblefoot," an infection that is difficult to cure and often leads to infection of the foot bone and death. A device is desirable to establish a level of protection for the bird against bumblefoot and afford prompt healing to existing foot wounds while providing grip and a range of motion necessary for mobility, roosting, and perching. However, no device exists that is worn to protect a bird's foot and is adapted for protecting the feet of birds that perch, climb, or roost. Single shoe devices shaped and configured for affixture on the leg of a large bird such as an emu, as disclosed in U.S. Pat. No. 5,406,722 to Jones, are not intended to provide the protection and cushioning necessary for inhibiting and healing of bumblefoot, do not facilitate healing of wounds on toes or pads of feet, and lack the flexible configuration necessary to provide mobility to multi-toed birds who perch, climb or roost.

Thus, a need exists to overcome the problems with the prior art systems, designs, and processes as discussed above.

SUMMARY OF THE INVENTION

The invention provides a protective shoe for birds that overcomes the hereinafore-mentioned disadvantages of the heretofore-known devices and methods of this general type and that prevents bumblefoot from forming, provides a barrier against dirt and moisture to enable healing of foot wounds, contains topical medication to facilitate wound care, and provides cushioning of wounded feet. The unique features that enhance durability and functionality of the shoe include a construction to protect the bird's foot while providing grip and the range of motion necessary for mobility, roosting, and perching. This shoe may be used on any multi-toed and/or webbed-toed birds such as poultry, fowl, psittacines, and raptors.

The protective shoe disclosed protects the feet of multi-toed birds. It can be used to prevent bumblefoot from forming, to enable the healing of existing foot or toe wounds, to facilitate wound care, and to provide cushioning of wounded feet. The shoe is durable and has the flexible configuration and grip necessary to enable birds to free-range, climb, perch, and roost while it is being worn.

With the foregoing and other objects in view, there is provided, in accordance with the invention, a bird shoe to accommodate at least one of toes and pads of a bird's foot, the shoe comprising a shoe body having an upper surface and a sole and defining bird toe covers corresponding in number to the number of front toes of the bird's foot; , an ankle cuff connected to the shoe body and having an ankle closure system formed to secure about an ankle of the bird's foot, and a closure tab connected to the shoe body and having a closure system formed to tighten the shoe body to the bird's foot.

In accordance with another feature of the invention, the bird toe covers include at least one of an open toe sleeve, open toe sleeves, a closed toe sleeve, closed toe sleeves, and a toe slit.

In accordance with a further feature of the invention, the bird toe covers include three toe slits or toe sleeves on a front of the shoe body and one toe slit or toe sleeve on a rear of the shoe body.

In accordance with an added feature of the invention, the bird toe covers include two toe slits or toe sleeves on a front of the shoe body and two toe slits or toe sleeves on a rear of the shoe body.

In accordance with an additional feature of the invention, the bird toe covers are open toe sleeves set to a length that allows nail tips of the bird to be exposed and, thereby, provide secure grip when climbing and perching.

In accordance with yet another feature of the invention, the bird toe covers include a linked set of toe coverings on a front of the shoe body and one toe slit or toe sleeve on a rear of the shoe body.

In accordance with yet a further feature of the invention, the ankle cuff has a first end attached to at least one of the upper surface and the sole or in between the upper surface and the sole and a second end left free.

In accordance with yet an added feature of the invention, the closure tab has a first end attached to at least one of the upper surface and the sole or in between the upper surface and the sole and a second end left free.

In accordance with yet an additional feature of the invention, the ankle cuff is attached to at least one of the top of the body and the sole of the body.

In accordance with again another feature of the invention, the shoe body is selected from at least one of the group consisting of neoprene, denim, canvas duck, leather, and nylon.

In accordance with again a further feature of the invention, the ankle cuff is selected from at least one of the group consisting of neoprene, denim, canvas duck, leather, and nylon.

In accordance with again an added feature of the invention, the ankle cuff is at least one of snaps, buttons, and hook-and-loop closures.

In accordance with again an additional feature of the invention, the closure tab is selected from at least one of the group consisting of neoprene, denim, canvas duck, leather, and nylon.

In accordance with still another feature of the invention, the closure tab is at least one of snaps, buttons, and hook-and-loop closures.

In accordance with still a further feature of the invention, the bird shoe is two shoes, a left shoe and a right shoe.

With the objects of the invention in view, there is also provided a method for protecting a foot of a bird with a shoe includes placing a shoe body onto a bird's foot by slipping at least one of the bird's front toes into at least one front toe cover, wrapping an ankle cuff around the bird's leg adjacent the bird's foot, feeding at least one back toe through at least one rear toe cover, and securing the ankle cuff at the bird's leg with an ankle closure system.

In accordance with another mode of the invention, the ankle closure system has opposite ends and is secured to the bird by marrying the opposite sides of the ankle closure system to each other.

In accordance with a further mode of the invention, a closure tab is tightened about the bird's foot to secure the shoe body to the bird's foot.

In accordance with an added mode of the invention, the closure tab is secured at one end to the shoe body and has an opposite end that is secured to the bird's foot by marrying one opposite end to the shoe body.

In accordance with an additional mode of the invention, the at least one front toe cover is a plurality of front toe covers corresponding in number to the number of front toes of the bird's foot and the shoe body is placed onto a bird's foot by slipping each of the bird's front toes into the at least one front toe cover.

In accordance with yet another mode of the invention, the at least one rear toe cover is a plurality of rear toe covers corresponding in number to the number of rear toes of the bird's foot and the shoe body is placed onto a bird's foot by slipping each of the bird's rear toes into the at least one rear toe cover.

In accordance with a concomitant mode of the invention, the placing, wrapping, feeding, and securing steps are carried out to place a shoe body on each of the bird's feet.

With the foregoing and other objects in view, there is provided, a a protective shoe to accommodate a foot of waterfowl having toes with nail tips includes a shoe body, an ankle cuff, and a closure tab. The shoe body is in approximately a shape of a waterfowl foot and has an upper surface and a sole connected together to define a left front opening, a center front opening, a right front opening, and a foot entrance opening into which the waterfowl foot is inserted. The front openings are sized to permit at least the nail tip of a respective toe to extend therethrough. The ankle cuff is connected to the shoe body and has an ankle closure system formed to secure about an ankle of the waterfowl's foot. The closure tab is connected to the shoe body and has a closure system formed to cover at least a portion of the foot entrance opening to secure the waterfowl's foot inside the shoe body.

In accordance with another feature, the upper surface and the sole are connected together at two connection areas to form the front openings.

In accordance with a further feature, the shoe body has a side and the foot entrance opening is a side opening at a side of the shoe body, the side opening defining an extent. In accordance with an added feature, the ankle cuff has a rear toe opening to permit at least a nail of a rear toe of the waterfowl foot to protrude therefrom.

In accordance with an additional feature, the shoe body has a rear toe opening to permit at least a nail of a rear toe of the waterfowl foot to protrude therefrom.

In accordance with yet another feature, the ankle cuff has a first end attached at least one of to the upper surface, to the sole, and in between the upper surface and the sole, and a second end left free.

In accordance with yet a further feature, the closure tab has a first end attached at least one of to the upper surface, to the sole, and in between the upper surface and the sole, and a second end left free.

In accordance with yet an added feature, the shoe body is selected from at least one of neoprene, denim, canvas duck, leather, and nylon.

In accordance with yet an additional feature, the ankle cuff is selected from at least one of neoprene, denim, canvas duck, leather, and nylon.

In accordance with again another feature, the ankle cuff is at least one of snaps, buttons, and hook-and-loop closures.

In accordance with again a further feature, the closure tab is selected from at least one of neoprene, denim, canvas duck, leather, and nylon.

In accordance with again an added feature, the closure tab is at least one of snaps, buttons, and hook-and-loop closures.

In accordance with again an additional feature, the bird shoe is two shoes, a left shoe and a right shoe.

With the objects in view, there is also provided a a method for protecting a foot of a waterfowl with a shoe includes the steps of providing a waterfowl shoe comprising a shoe body in approximately a shape of a waterfowl foot and having an upper surface and a sole connected together to define a left front opening, a center front opening, a right front opening, and a foot entrance opening into which the waterfowl foot is inserted, the front openings being sized to permit at least the nail tip of a respective toe to extend therethrough, an ankle cuff connected to the shoe body and having an ankle closure system formed to secure about an ankle of the waterfowl's foot, and a closure tab connected to the shoe body and having a closure system formed to cover at least a portion of the foot entrance opening to secure the waterfowl's foot inside the shoe body, placing the shoe body onto a waterfowl foot by slipping the foot into the foot entrance, wrapping the ankle cuff around the waterfowl's leg adjacent the waterfowl foot, and securing the ankle cuff at the waterfowl's leg with an ankle closure system.

In accordance with still another mode, the ankle cuff has a rear toe opening to permit at least a nail of a rear toe of the waterfowl foot to protrude therefrom and which further comprises feeding at least the nail of the rear toe through the rear toe opening.

In accordance with still a further mode, the ankle closure system has opposite ends and is secured to the waterfowl by marrying the opposite ends of the ankle closure system to each other.

In accordance with still an added mode, the closure tab is secured at one end to the shoe body and has an opposite end that secures the waterfowl foot therein by marrying the one end and the opposite end.

In accordance with a concomitant mode, the providing placing, wrapping, and securing steps are carried to place the shoe body on each of the waterfowl's feet.

Although the invention is illustrated and described herein as embodied in a protective shoe for birds, it is, nevertheless, not intended to be limited to the details shown because various modifications and structural changes may be made therein without departing from the spirit of the invention and within the scope and range of equivalents of the claims. Additionally, well-known elements of exemplary embodiments of the invention will not be described in detail or will be omitted so as not to obscure the relevant details of the invention.

Additional advantages and other features characteristic of the present invention will be set forth in the detailed description that follows and may be apparent from the detailed description or may be learned by practice of exemplary embodiments of the invention. Still other advantages of the invention may be realized by any of the instrumentalities, methods, or combinations particularly pointed out in the claims.

Other features that are considered as characteristic for the invention are set forth in the appended claims. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward.

BRIEF DESCRIPTION OF THE DRAWINGS

The accompanying figures, where like reference numerals refer to identical or functionally similar elements throughout the separate views, which are not true to scale, and which, together with the detailed description below, are incorporated in and form part of the specification, serve to illustrate further various embodiments and to explain various principles and advantages all in accordance with the present invention. Advantages of embodiments of the present invention will be apparent from the following detailed description of the exemplary embodiments thereof, which description should be considered in conjunction with the accompanying drawings in which.

DETAILED DESCRIPTION OF THE INVENTION

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward.

Alternate embodiments may be devised without departing from the spirit or the scope of the invention. Additionally, well-known elements of exemplary embodiments of the invention will not be described in detail or will be omitted so as not to obscure the relevant details of the invention.

Before the present invention is disclosed and described, it is to be understood that the terminology used herein is for the purpose of describing particular embodiments only and is not intended to be limiting. The terms "a" or "an", as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically.

Relational terms such as first and second, top and bottom, and the like may be used solely to distinguish one entity or action from another entity or action without necessarily requiring or implying any actual such relationship or order between such entities or actions. The terms "comprises," "comprising," or any other variation thereof are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

As used herein, the term "about" or "approximately" applies to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure.

Herein various embodiments of the present invention are described. In many of the different embodiments, features are similar. Therefore, to avoid redundancy, repetitive description of these similar features may not be made in some circumstances. It shall be understood, however, that description of a first-appearing feature applies to the later described similar feature and each respective description, therefore, is to be incorporated therein without such repetition.

A bird shoe described herein is made up of a body 1 and an ankle cuff 2. FIGS. 1 through 7 show various exemplary embodiments of the bird shoe and its elements. With regard to FIGS. 1 to 3, these elements are connected by attaching the ankle cuff 2 to the top and sole 4 of the body 1 (or by making the ankle cuff 2 integral with one or the other). A closure tab 3 also can be provided. The body 1 has a corresponding number of toe sleeves in the front or back to accommodate the particular bird's toes and the body 1 can be made with toe covers that include toe sleeves 5 and/or toe slits 6 (shown with dashed lines). The body 1 can be made with a top and sole 4 of one or more layers of various rip-, tear-, and/or puncture-resistant materials, such as, but not limited to, neoprene, denim, canvas duck, leather, nylon, but neoprene is a particularly good selection. The sole 4 or just the outer side of the sole 4 (see, e.g., FIG. 9, 13, or 14) can be non-slip or textured neoprene, denim, canvas duck, leather, nylon, but neoprene is a particularly good selection. The ankle cuff 2 can be made of various materials, such as, but not limited to, neoprene, denim, canvas duck, leather, nylon, but neoprene is a particularly good selection. The ankle cuff 2 in an exemplary embodiment is sewn onto the body, but can be secured with various methods, such as, but not limited to, snaps, button, hook-and-loop closures, but sewing is a particularly good selection. The body 1 and ankle cuff 2 contain the corresponding number of toe sleeves 5 or slits 6 to accommodate the particular bird's back toes. The ankle cuff 2 contains an ankle closure system 7 such as, but not limited to, snaps, button, hook-and-loop closures, but hook-and-loop closures are a particularly good selection. The closure tab 3 can be made of various materials, such as, but not limited to, neoprene, denim, canvas duck, leather, nylon, but neoprene is a particularly good selection. The closure tab 3 contains one part of a closure system 8 and the top side of the body 3 contains the other part of the closure system 9, such as, but not limited to, snaps, button, hook-and-loop closures, but hook-and-loop is a particularly good selection. The ankle closure system 7 and the closure tab 3 are sewn onto the body 1 but can be secured with various methods, such as, but not limited to, snaps, button, hook-and-loop closures, but sewing is a particularly good selection.

The location, shape, length and number of toe sleeves 5 or slits 6 on the shoe are dependent on the foot configuration of the particular bird. If the shoe is for a chicken, raptor, or other bird with three front-facing toes and one rear-facing toe, then the shoe is configured with three slits 6 or toe sleeves 5 on the front and one slit 6 or sleeve 5 on the back (see, e.g., FIGS. 1 to 4). If the shoe is for a psittacine, owl, or other bird with two front facing toes and two rear-facing toes, then the shoe is configured with two front sleeves 5 or toe slits 6 and two rear sleeves 5 or slits 6 (see, e.g., FIGS. 5 and 6). If the shoe is for a bird with webbed feet or a foot that needs protection from moisture, then the shoe is configured with an open or closed front toe sleeve 5 shaped to accommodate the webbed foot therein and a toe slit 6 or sleeve 5 in the back, as shown, for example, in FIGS. 7, 8, 9, 10, and 16. The left foot of the shoes is depicted in FIG. 7 for brevity because the left and right shoes are mirror images of each other.

Figure 1:
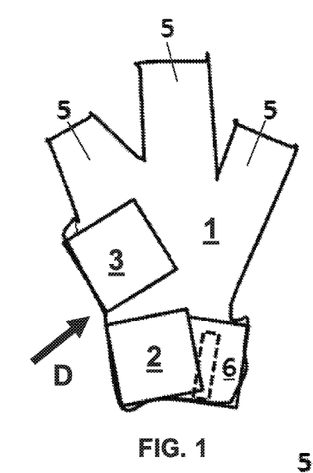
FIG. 1 is a top perspective view of an exemplary embodiment of a left bird shoe with three front-facing toe sleeves and one rear toe slit in a closed orientation.

Described now are exemplary embodiments of the present invention. Referring now to the figures of the drawings in detail and first, particularly to FIG. 1, there is shown a first exemplary embodiment of a left bird shoe with three front-facing toe sleeves 5 and a slit 6 for a rear toe in a closed configuration. This style is used for birds having three front toes and one rear toe, such as chickens and raptors, who need coverage of both toes and the foot pad. The open sleeves 5 are lengthened appropriately so that the nail tips are exposed to enable the bird to scratch and to provide secure grip when jumping and roosting. As stated above, the right shoe is a mirror image and is, therefore, not depicted. The junction of the top and sole 4 portions of the body 1 within the closed closure tab 3 in FIG. 1 is not connected to form a pocket opening into which the bird's foot is guided to install the shoe. The direction that the bird's foot traverses when installing the shoe is indicated with the large arrow D in FIG. 1.

Figure 2:
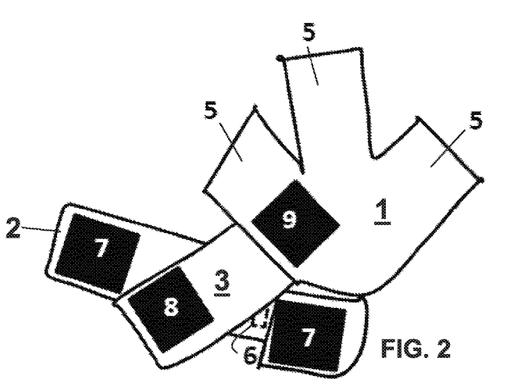
FIG. 2 is a top perspective view of the left bird shoe of FIG. 1 in an open orientation

FIG. 2 shows the left bird shoe of FIG. 1 with the three front-facing sleeves 5 and the one 6 rear toe slit in an open orientation. The shoe is placed onto the bird's foot by slipping the bird's foot in the direction D and inserting bird's front toes into the respective sleeves 5. As the ankle cuff 2 is wrapped around the bird's leg, the back toe is fed through the rear toe slit 6. The ankle closure system 7 on the ankle cuff 2 is used to secure the shoe to the bird by marrying the opposite sides of the ankle closure system 7 to each other. The shoe is tightened and closed upon the bird's foot by wrapping the closure tab 3 from the sole to the top side and marrying the two sides of the closure system 8 and 9. As stated above, the right shoe is a mirror image and is, therefore, not depicted.

Figure 3:
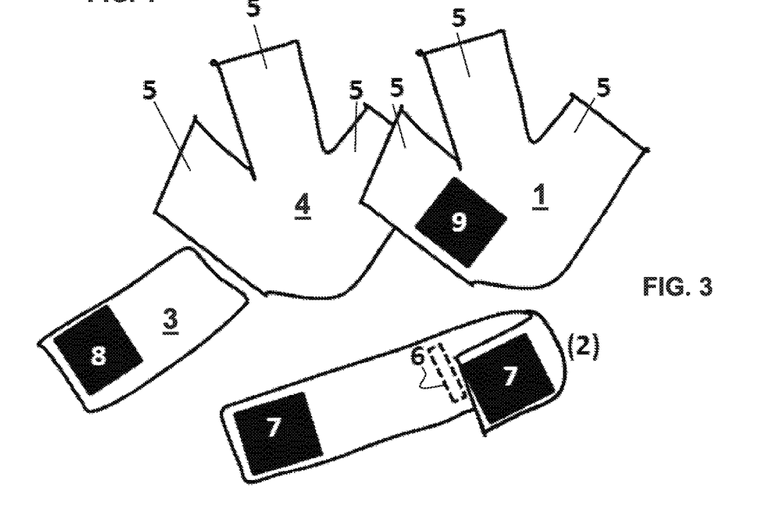
FIG. 3 is an exploded perspective view of a top side of the left bird shoe of FIG. 1.

FIG. 3 is an exploded view of the left bird shoe of FIGS. 1 and 2 with the three front-facing toe sleeves 5 and the one rear toe slit 6. As can be seen from FIG. 3, the body 1 comprises the sole 4 attached to the top of the shoe. The ankle cuff 2 contains the rear toe slit 6 and the ankle closure system 7. One end of the ankle cuff 2 (or a mid-portion) is attached to both the top side of the body and the sole 4 (or to one or the other or in between) and the other is left free. With regard to the closure system 3, one side 9 is attached to the upper side of the top of the shoe, to the lower side of the sole 4, or between the sole 4 and the top of the shoe and the other is left free to close the opening into which the bird's foot is inserted.

Figure 4:
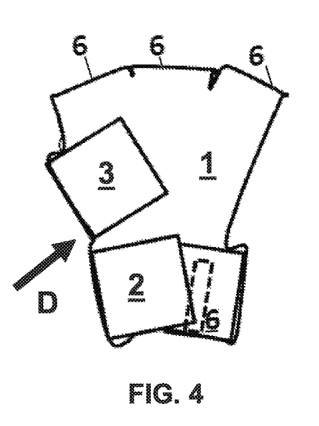
FIG. 4 is a top perspective view of another exemplary embodiment of a bird shoe with three front-facing slits and one rear toe slit in a closed orientation.

FIG. 4 shows another embodiment of a left bird shoe with three front-facing slits 6 and one rear toe slit 6 in a closed configuration. This style is used for birds with three front toes and one rear toe, such as chickens and raptors, who need only foot pad coverage. As stated above, the right shoe is a mirror image and is, therefore, not depicted. As above, the junction of the top and sole portions of the body 1 within the closed closure tab 3 in FIG. 4 is not connected to form a pocket opening into which the bird's foot is guided to install the shoe. The direction that the bird's foot traverses when installing the shoe is indicated with the large arrow D in FIG. 4.

Figure 5:
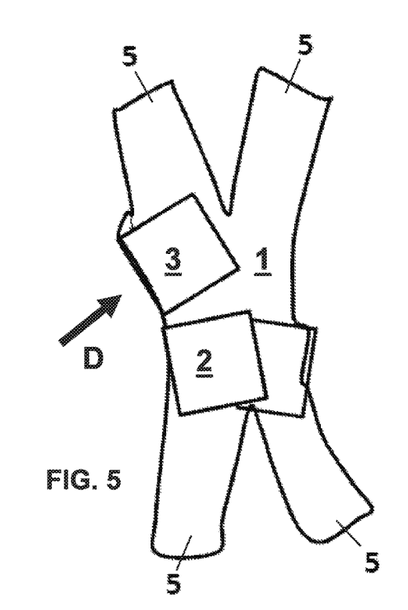
FIG. 5 is a top perspective view of a further exemplary embodiment of a left bird shoe with two front-facing toe sleeves and two rear toe sleeves in a closed orientation.

FIG. 5 shows an embodiment of a left bird shoe with two front-facing toe sleeves 5 and two rear toe sleeves 5 in a closed configuration. This style is used for bird with two front toes and two back toes, such as psitticines and owls, who need toes and foot pad covered. The open sleeves 5 are set to a respective length that allows the nail tips to be exposed and provide secure grip when climbing and perching. As stated above, the right shoe is a mirror image and is, therefore, not depicted. The junction of the top and sole portions of the body 1 within the closed closure tab 3 in FIG. 5 is not connected to form a pocket opening into which the bird's foot is guided to install the shoe. The direction that the bird's foot traverses when installing the shoe is indicated with the large arrow D in FIG. 5.

Figure 6:
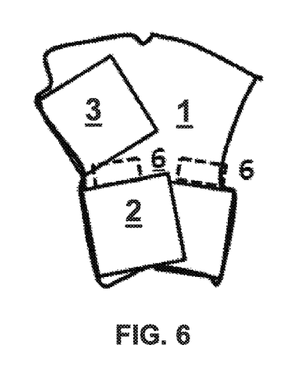
FIG. 6 is a top perspective view of still another exemplary embodiment of a left bird shoe with two front-facing slits and two rear toe slits in a closed orientation.
Figure 7:
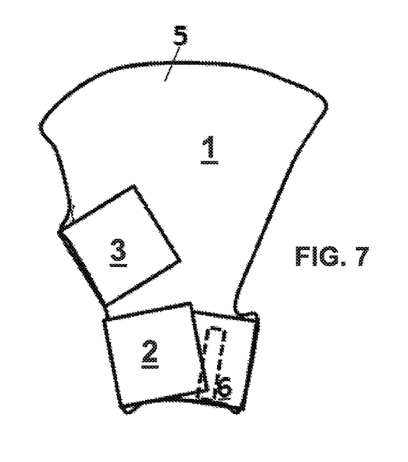
FIG. 7 is a top perspective view of yet another exemplary embodiment of a left bird shoe with closed front-facing webbed toe sleeve and one rear toe slit in a closed orientation.

FIG. 6 shows an embodiment of a bird shoe with two front-facing slits 6 and two rear toe slits 6 in a closed configuration similar to the embodiment of FIG. 6. This style, however, is used for birds with two front toes and two rear toes, such as psittacines and owls, who only need foot pad coverage. As stated above, the right shoe is a mirror image and is, therefore, not depicted.

FIG. 7 shows an exemplary embodiment of a left shoe with joined toe sleeves 5 for water fowl, which have webbed feet, and chickens who have wounds that require protection from moisture, the shoe being in an entirely closed configuration. The toe slit 6 in the ankle cuff 2 accommodates the rear toe. As stated above, the right shoe is a mirror image and is, therefore, not depicted.

Figure 8:
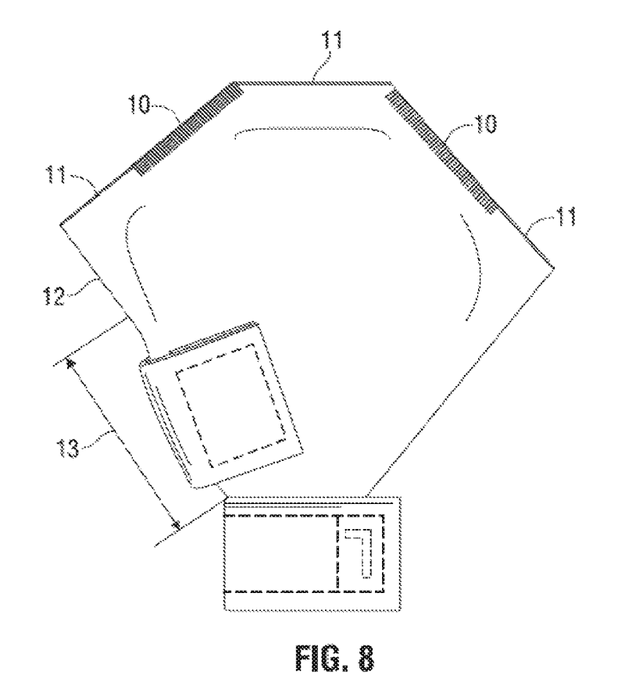
FIG. 8 is a top perspective view of a left bird shoe of an exemplary embodiment of FIG. 4 with three front-facing webbed slits and one rear toe slit in a closed orientation.
Figure 9:
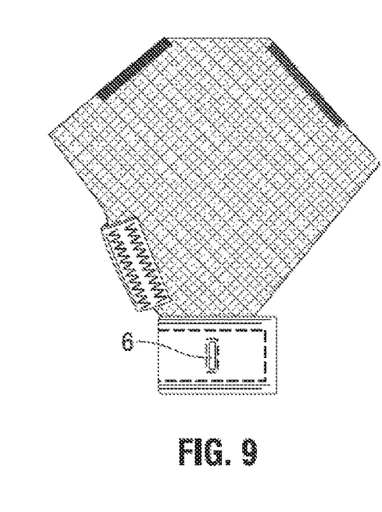
FIG. 9 is a bottom perspective view of a smaller version of a right bird shoe of an exemplary embodiment of FIG. 8 with three front-facing webbed slits and one rear toe slit in a closed orientation.
Figure 10:
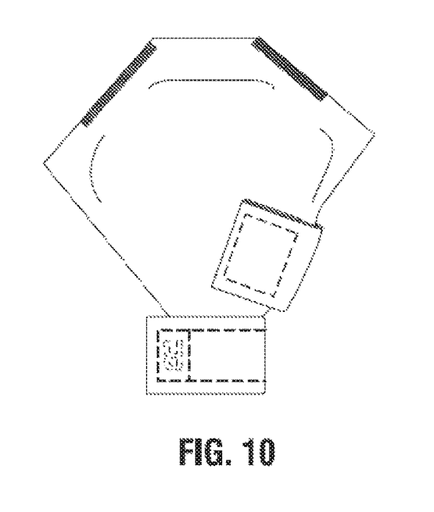
FIG. 10 is a bottom perspective view of a smaller version of a right bird shoe of an exemplary embodiment of FIG. 8 and larger than the shoe of FIG. 9 with three front-facing webbed slits and one rear toe slit in a closed orientation.

FIGS. 8, 9, and 10 show an exemplary embodiment of a left shoe with joined toe sleeves 5 for water fowl, which have webbed feet, this shoe being in an open configuration. In particular, two connection areas 10 securing the top and sole of the shoe form three toe openings 11 through which the bird's toes can protrude. These connection areas 10 together define a linked set of toe coverings that can be open as shown or entirely closed (not illustrated). Another connection area 12 can be provided at the foot entrance if desired to define the extent 13 of the opening of the foot entrance. The toe slit 6 in the ankle cuff 2 accommodates the rear toe. As stated above, the right shoe is a mirror image and is, therefore, not depicted. The difference between the configurations of FIGS. 8, 9, and 10 is the size of the foot to which the shoe corresponds. Each of the configuration is for a water fowl (i.e., duck-like avians). The smallest, shown in FIG. 9, can be for a mallard, for example. The next larger size, shown in FIG. 10, can be for a muscovy duck, for example. Finally, the largest size, shown in FIG. 8, can be for, e.g., a goose. Each is shown as either the left or right foot but, if desired, each can comprise a left and right pair. The connection areas 10 are in an exemplary embodiment equal in size. However, if desired, as shown in FIG. 8, the lengths of the connection areas 10 can be customized to fit the particular bird's foot.

Figure 11:
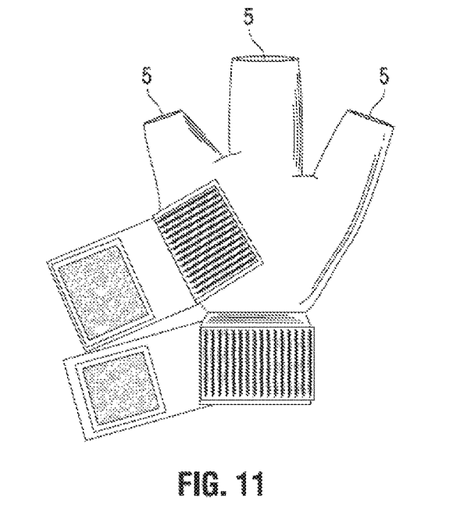
FIG. 11 is a top perspective view of an exemplary embodiment of the left bird shoe of FIG. 1 with three front-facing toe sleeves and one rear toe slit in an open orientation.
Figure 12:
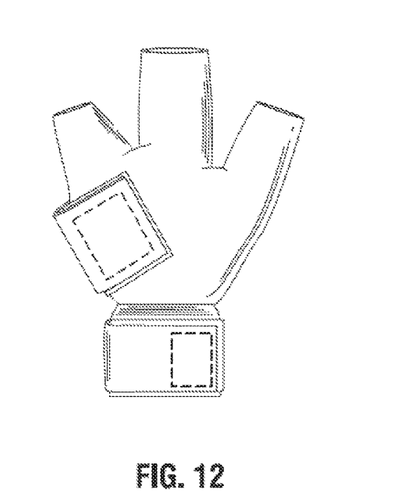
FIG. 12 is a top perspective view of the left bird shoe of FIG. 11 in a closed orientation.
Figure 13:
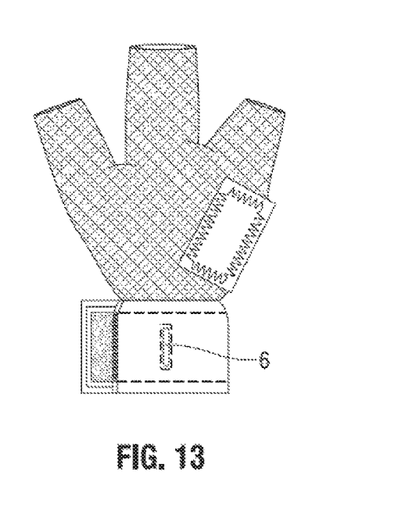
FIG. 13 is a bottom perspective view of the left bird shoe of FIG. 11 in the closed orientation.
Figure 14:
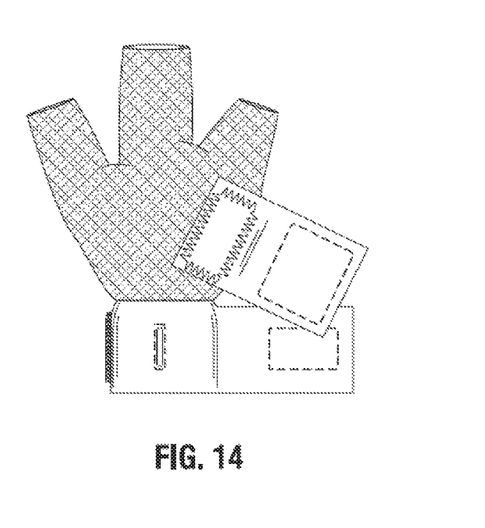
FIG. 14 is a bottom perspective view of the left bird shoe of FIG. 11 in the open orientation.

FIGS. 11 to 14 show an exemplary embodiment of a left bird shoe similar to FIG. 1 with three front-facing toe sleeves 5 and a slit 6 for a rear toe. FIGS. 11 and 12 show the top of the shoe in the open and closed configurations, respectively, and FIGS. 13 and 14, show the bottom of the shoe in the closed and open configurations, respectively. This style is used for birds having three front toes and one rear toe, such as chickens and raptors, who need coverage of both the toes and the foot pad. The open sleeves 5 are lengthened appropriately so that the nail tips are exposed to enable the bird to scratch and to provide secure grip when jumping and roosting. As stated above, the right shoe is a mirror image and is, therefore, not depicted. As above, the junction of the top and sole 4 portions of the body 1 within the closed closure tab 3 in FIGS. 12 and 13 is not connected to form a pocket opening into which the bird's foot is guided to install the shoe.

Figure 15:
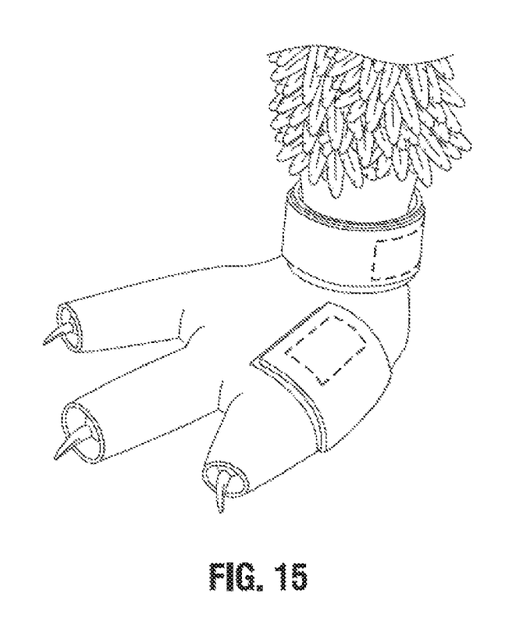
FIG. 15 is a fragmentary, perspective view of the left bird shoe of FIGS. 11 to 14 closed on a bird's foot.
Figure 16:
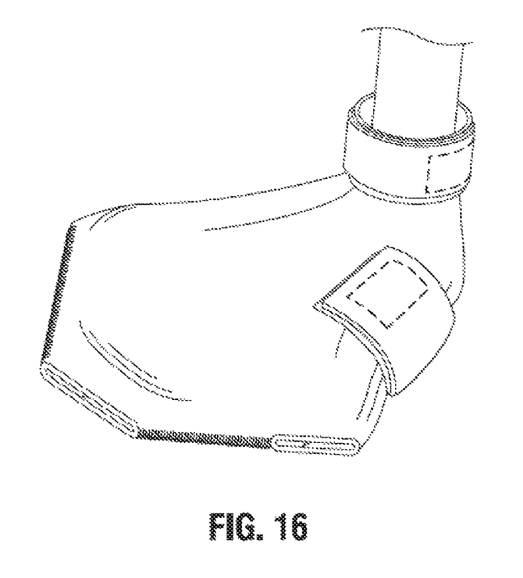
FIG. 16 is a fragmentary, perspective view of a right bird shoe of the exemplary embodiment of FIGS. 8 to 10 closed on a bird's webbed foot.

FIG. 15 illustrates an exemplary configuration of the shoe of FIGS. 11 to 14 installed on a foot of a chicken. FIG. 16 illustrates an exemplary configuration of the shoe of FIGS. 8 to 10 installed on a foot of a duck.

In any embodiment described herein, the seams on the inside of the opens toes can be sized to provide both adequate space for toes and structure to enable circulation of air. Such a configuration provides space sufficient for bandaging and padding of a wound, for example, with a cotton ball or two.

The bird shoes described herein provide an effective barrier and cushion between surfaces and the bird's foot. This flexible shoe can be worn by birds to prevent bumblefoot from forming, to provide a barrier against dirt and moisture to enable healing of foot wounds, to contain topical medication to facilitate wound care, and to provide cushioning of wounded feet. The unique features that enhance durability and functionality of the shoe include a construction that protects the bird's foot while providing grip and the range of motion necessary for mobility, roosting and perching. These shoes may be used on any multi-toed and/or webbed-toed birds such as poultry, fowl, psittacines and raptors.

It is noted that various individual features of the inventive processes and systems may be described only in one exemplary embodiment herein. The particular choice for description herein with regard to a single exemplary embodiment is not to be taken as a limitation that the particular feature is only applicable to the embodiment in which it is described. All features described herein are equally applicable to, additive, or interchangeable with any or all of the other exemplary embodiments described herein and in any combination or grouping or arrangement. In particular, use of a single reference numeral herein to illustrate, define, or describe a particular feature does not mean that the feature cannot be associated or equated to another feature in another drawing figure or description. Further, where two or more reference numerals are used in the figures or in the drawings, this should not be construed as being limited to only those embodiments or features, they are equally applicable to similar features or not a reference numeral is used or another reference numeral is omitted.

The foregoing description and accompanying drawings illustrate the principles, exemplary embodiments, and modes of operation of the invention. However, the invention should not be construed as being limited to the particular embodiments discussed above. Additional variations of the embodiments discussed above will be appreciated by those skilled in the art and the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. A bird shoe for a waterfowl foot having toes with nail tips, the shoe comprising:
   a shoe body:
      having a substantially triangular shape adapted to a shape of a waterfowl foot; and
      having an upper surface and a sole connected together to define a left front opening, a center front opening, a right front opening, and a foot entrance opening into which the waterfowl foot is inserted, the front openings being sized to permit at least the nail tip of a respective toe to extend therethrough; and
   an ankle cuff connected to the shoe body and having an ankle closure system formed for securing about an ankle of the waterfowl's foot; and a closure tab connected to the shoe body and having a closure system formed to cover at least a portion of the foot entrance opening to secure the waterfowl's foot inside the shoe body.

2. The bird shoe according to claim 1, wherein the upper surface and the sole are connected together at two connection areas to form the front openings.

3. The bird shoe according to claim 1, wherein:
the shoe body has a side; and
the foot entrance opening is a side opening at a side of the shoe body, the side opening defining an extent.

4. The bird shoe according to claim 1, wherein the ankle cuff has a rear toe opening for permitting at least a nail of a rear toe of the waterfowl foot to protrude therefrom.

5. The bird shoe according to claim 1, wherein the shoe body has a rear toe opening for permitting at least a nail of a rear toe of the waterfowl foot to protrude therefrom.

6. The bird shoe according to claim 1, wherein the ankle cuff has:
a first end attached at least one of:
to the upper surface;
to the sole; and
in between the upper surface and the sole; and
a second end left free.

7. The bird shoe according to claim 1, wherein the closure tab has:
a first end attached at least one of:
to the upper surface;
to the sole; and
in between the upper surface and the sole; and
a second end left free.

8. The bird shoe according to claim 1, wherein the shoe body is selected from at least one of neoprene, denim, canvas duck, leather, and nylon.

9. The bird shoe according to claim 1, wherein the ankle cuff is selected from at least one of neoprene, denim, canvas duck, leather, and nylon.

10. The bird shoe according to claim 1, wherein the ankle cuff is at least one of snaps, buttons, and hook-and-loop closures.

11. The bird shoe according to claim 1, wherein the closure tab is selected from at least one of neoprene, denim, canvas duck, leather, and nylon.

12. The bird shoe according to claim 1, wherein the closure tab is at least one of snaps, buttons, and hook-and-loop closures.

13. The bird shoe according to claim 1, wherein the bird shoe is two shoes, a left shoe and a right shoe.

\* \* \* \* \*